United States Patent
Fillot et al.

(10) Patent No.: US 10,808,089 B2
(45) Date of Patent: Oct. 20, 2020

(54) ADAPTIVE VAPOR BARRIER

(71) Applicant: RHODIA OPERATIONS, Paris (FR)

(72) Inventors: Louise-Anne Fillot, Vaulx-en-Velin (FR); Stephane Jeol, Cumming, GA (US)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 14/904,994

(22) PCT Filed: Jul. 21, 2014

(86) PCT No.: PCT/EP2014/065646
§ 371 (c)(1),
(2) Date: Jan. 14, 2016

(87) PCT Pub. No.: WO2015/007918
PCT Pub. Date: Jan. 22, 2015

(65) Prior Publication Data
US 2016/0152784 A1    Jun. 2, 2016

(30) Foreign Application Priority Data
Jul. 19, 2013 (FR) ...................... 13 01724

(51) Int. Cl.
| | |
|---|---|
| *C08J 5/18* | (2006.01) |
| *B32B 27/34* | (2006.01) |
| *C09J 7/25* | (2018.01) |
| *E04B 1/62* | (2006.01) |
| *C08G 69/26* | (2006.01) |
| *C08G 69/42* | (2006.01) |
| *B32B 21/08* | (2006.01) |
| *B32B 23/08* | (2006.01) |

(52) U.S. Cl.
CPC .............. *C08J 5/18* (2013.01); *B32B 21/08* (2013.01); *B32B 23/08* (2013.01); *B32B 27/34* (2013.01); *C08G 69/265* (2013.01); *C08G 69/42* (2013.01); *C09J 7/25* (2018.01); *E04B 1/625* (2013.01); *B32B 2250/02* (2013.01); *B32B 2307/7265* (2013.01); *C08J 2377/06* (2013.01); *C09J 2477/006* (2013.01)

(58) Field of Classification Search
CPC ...................................... C08G 69/42
See application file for complete search history.

(56) References Cited

U.S. PATENT DOCUMENTS

| | | | |
|---|---|---|---|
| 5,242,733 A | 9/1993 | Windley et al. | |
| 6,211,402 B1 | 4/2001 | Kleiner | |
| 6,255,371 B1 | 7/2001 | Schlosser et al. | |
| 6,344,158 B1 | 2/2002 | Schlosser et al. | |
| 6,365,071 B1 | 4/2002 | Jenewein et al. | |
| 2004/0103603 A1* | 6/2004 | Kunzel | B32B 7/02 52/404.1 |
| 2012/0172521 A1 | 7/2012 | Tourand et al. | |
| 2012/0302698 A1* | 11/2012 | Dorn | E04D 12/002 524/606 |
| 2013/0150524 A1* | 6/2013 | Jeol | C08G 69/42 524/606 |

FOREIGN PATENT DOCUMENTS

| | | |
|---|---|---|
| WO | WO 96/33321 A1 | 10/1996 |
| WO | WO 2011/000763 A1 | 1/2011 |
| WO | 2011 147739 | * 12/2011 |
| WO | WO 2011/147739 A1 | 12/2011 |

OTHER PUBLICATIONS

Kunzel, et al. "Von der Idee einer feuchteadaptiven Dampfbremse bis zur Markteinfuhrunt" (1998) BAUPHYSIK, vol. 20, No. 6, pp. 257-260 (Includes Abstract in English—2$^{nd}$ Paragraph).

* cited by examiner

*Primary Examiner* — Kuo Liang Peng

(57) ABSTRACT

The present invention relates to the use, as water vapour barrier, of a film, of a textile or of a layer of material P, said material P comprising, or even consisting of, at least one copolymer A which is a polyamide of PAXY/XAIS $M^{n+}{}_{1/n}$ type or of PAZ/XAIS $M^{n+}{}_{1/n}$ type. It also relates to a construction element comprising a film, a textile or a layer of said material P and a construction material.

15 Claims, No Drawings

ADAPTIVE VAPOR BARRIER

This application is a U.S. national phase entry under 35 U.S.C. § 371 of International Application No. PCT/EP2014/065646, filed on Jul. 21, 2014, which claims priority to French application No. 1301724, filed on Jul. 19, 2013. The entire contents of these applications are incorporated herein by this reference.

The present invention relates to a water vapor barrier. Said barrier can be referred to as "breathable" or "adaptive", i.e. having a low permeability to water vapor when the humidity level is low and a higher permeability when the humidity level is high. It can also be denoted a vapor-modulable barrier. In other words, said vapor-barrier material adapts to ambient humidity. The invention relates more specifically to the use of a specific polyamide for preparing such a barrier.

Prior art documents describe vapor barriers which are in particular adaptive to ambient humidity. However, said barriers frequently have vapor-barrier properties that are limited at low humidity, which can lead to the use of large amounts of barrier material, in particular of film, having quite a large thickness, and even more frequently an insufficient differential between the vapor permeability at low humidity level and at high humidity level, i.e. a poor adaptation to ambient humidity.

In particular, document EP 0 821 755 describes vapor barriers comprising PA6. The vapor-barrier properties of PA6 can be insufficient. Moreover, when additives are added in order to decrease the vapor permeability at low humidity level, this results in the vapor permeability at high humidity level also being decreased, and when additives are added in order to increase the vapor permeability at high humidity level, this results in the vapor permeability at low humidity level also being increased.

Document US 20120302698 describes barriers comprising PA6 and additives of the polymer type in order to provide three levels of vapor permeability according to the average humidity. These mixtures result in particular in levels of vapor permeability at low humidity which can be unsatisfactory. In addition, these mixtures can result in quite complex recycling of the material.

There is therefore a need for barriers which make it possible to totally or partly overcome the drawbacks mentioned above, and in particular which have a lower vapor permeability at low humidity, and a higher vapor permeability at high humidity level, or else which have a high vapor permeability differential depending on whether the humidity level is high or low.

In the context of the present invention, an average humidity level of 25%, RH25, is considered to be a low humidity level and an average humidity level of 75%, RH75, is considered to be a high humidity level.

The present invention relates to a water vapor barrier, in particular an ambient-humidity-adaptive water vapor barrier, comprising, or even consisting of, a film, a textile or a layer of material P, said material P comprising, or even consisting of, at least one copolymer A which is a polyamide of PAXY/XAIS $M^{n+}{}_{1/n}$ type, in particular PA66/6AISM$^{n+}{}_{1/n}$, more particularly PA66/6AISLi and/or PA PA66/6AISNa, or of PAZ/XAISM$^{n+}{}_{1/n}$ type, in which X, Y and Z represent, independently of one another, integers ranging from 3 to 36, in particular from 4 to 18, especially from 4 to 12, $M^{n+}{}_{1/n}$, with n representing the number of charges of M, and M representing Li$^+$, Na$^+$, K$^+$, Ag$^+$, Cu$^+$, Cu$^{2+}$ Zn$^{2+}$, Mn$^{2+}$, Mg$^{2+}$, Fe$^{2+}$, Fe$^{3+}$, Al$^{3+}$, NH$^{4+}$, and/or phosphonium, in particular Li$^+$ and/or Na$^+$, in particular Li$^+$, and AIS represents the residue derived from 5-sulfoisophthalic acid and optionally a support and/or an adhesive, in particular said barrier, and in particular said film, textile or layer of material P, has a (water vapor permeability at 23° C. and at an average humidity level of 75%, i.e. RH75)/(water vapor permeability at 23° C. and at an average humidity level of 25%, i.e. RH25) ratio greater than or equal to 15, especially greater than or equal to 20, in particular greater than or equal to 25, quite particularly greater than or equal to 30, or even greater than or equal to 35;

quite particularly, said barrier, and in particular said film, textile or layer of material P, has a water vapor permeability:

less than or equal to 0.25 g·mm/m$^2$·J, at 23° C. and at an average humidity level of 25%, and/or greater than or equal to 3 g·mm/m$^2$·J, at 23° C. and at an average humidity level of 75%.

According to a first aspect, a subject of the present invention is the use, as a water vapor barrier, in particular as an ambient-humidity-adaptive water vapor barrier, of a film, a textile or a layer of material P, said material P comprising, or even consisting of, at least one copolymer A which is a polyamide of PAXY/XAIS $M^{n+}{}_{1/n}$ type, in particular PA66/6AISM$^{n+}{}_{1/n}$, more particularly PA66/6AISLi and/or PA PA66/6AISNa, or of PAZ/XAISM$^{n+}{}_{1/n}$ type, in which X, Y and Z represent, independently of one another, integers ranging from 3 to 36, in particular from 4 to 18, especially from 4 to 12, $M^{n+}{}_{n/1}$, with n representing the number of charges of M, and M representing Li$^+$, Na$^+$, K$^+$, Ag$^+$, Cu$^+$, Cu$^{2+}$ Zn$^{2+}$, Mn$^{2+}$, Mg$^{2+}$, Fe$^{2+}$, Fe$^{3+}$, Al$^{3+}$, NH$^{4+}$, and/or phosphonium, in particular Li$^+$ and/or Na$^+$, in particular Li$^+$, and AIS represents the residue derived from 5-sulfoisophthalic acid and optionally in combination with a support and/or an adhesive.

In particular, said film, textile or layer of material P used has a (water vapor permeability at 23° C. and at an average humidity level of 75%, i.e. RH75)/(water vapor permeability at 23° C. and at an average humidity level of 25%, i.e. RH25) ratio greater than or equal to 15, especially greater than or equal to 20, in particular greater than or equal to 25, quite particularly greater than or equal to 30, or even greater than or equal to 35.

Quite particularly, said film, textile or layer of material P used has a water vapor permeability:

less than or equal to 0.25 g·mm/m$^2$·J, at 23° C. and at an average humidity level of 25%, and/or greater than or equal to 3 g·mm/m$^2$·J, at 23° C. and at an average humidity level of 75%.

The material P used is therefore a composition comprising, or consisting of, at least one copolyamide A.

According to the invention, the copolymer A, or even the material P, in particular in the form of a film, layer or textile of material P, can be used to manufacture a water vapor barrier, in particular an ambient-humidity-adaptive water vapor barrier.

For the purposes of the present invention, the term "average humidity level of A %" (or alternatively average relative humidity), or RH$_A$, is intended to mean that on one side of a membrane of material P, the humidity level is B %, i.e. RH$_B$, and on the other side it is C %, i.e. RH$_C$, B and C being such that [(B+C)/2]=A. In particular, when A=25 then B=0 and C=50, and when A=75 then B=50 and C=100. Such a configuration is described in the examples below.

AISM$^{n+}_{1/n}$ can be represented in the following way:

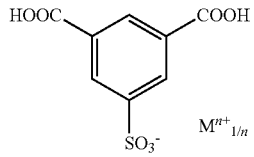

The term "PAXY/XAISM$^{n+}_{1/n}$" in which X and Y are independent of one another and represent integers ranging from 3 to 36, in particular from 4 to 18, especially from 4 to 12, is intended to mean a copolymer obtained by polymerization, in particular random polymerization,
of a diamine, in particular an aliphatic diamine, comprising X carbon atoms separating the two amine functions involved in the amide bonds,
of a diacid, in particular an aliphatic diacid, comprising Y-2 carbon atoms separating the two acid functions involved in the amide bonds, and
of 5-sulfoisophthalic acid of lithium, sodium, potassium, silver, copper I or II, zinc, manganese, magnesium, iron II or III, ammonium or phosphonium.

The diamine can be selected from 1,4-diaminobutane, 1,5-diaminopentane, 1,6-diaminohexane or hexamethylenediamine (HMD), 2-methylpentamethylenediamine, 2-methylhexamethylenediamine, 3-methylhexamethylenediamine, 2,5-dimethylhexamethylenediamine, 2,2-dimethylpentamethylenediamine, 1,8-diaminooctane, methyl-1,8-diaminooctane, 1,9-diaminononane, 5-methylnonanediamine, 1,10-diaminodecane or decamethylenediamine, 1,12-diaminododecane, or dodecamethylenediamine, and N-(6-aminohexyl)-N-methyl-1,6-hexanediamine.

The diacid can be selected from oxalic acid, succinic acid (HOOC—(CH$_2$)$_2$—COOH), glutaric acid (HOOC—(CH$_2$)$_3$—COOH), 2-methylglutaric acid (HOOC—CH(CH$_3$)—(CH$_2$)$_2$—COOH), 2,2-dimethylglutaric acid (HOOC—C(CH$_3$)$_2$—(CH$_2$)$_2$—COOH), adipic acid (HOOC—(CH$_2$)$_4$—COOH), 2,4,4-trimethyladipic acid (HOOC—CH(CH$_3$)—CH$_2$—C(CH$_3$)$_2$—CH$_2$—COOH), pimelic acid (HOOC—(CH$_2$)$_5$—COOH), suberic acid (HOOC—(CH$_2$)$_6$—COOH), azelaic acid (HOOC—(CH$_2$)$_7$—COOH), sebacic acid (HOOC—(CH$_2$)$_8$—COOH), undecanedioic acid (HOOC—(CH$_2$)$_9$—COOH), dodecanedioic acid (HOOC—(CH$_2$)$_{10}$—COOH), terephthalic acid and isophthalic acid.

Quite particularly, the PAXY/XAISM$^{n+}_{1/n}$ is selected from PA46/4AISM$^{n+}_{1/n}$, PA410/4AISM$^{n+}_{1/n}$, PA412/4AISM$^{n+}_{1/n}$, PA66/6AISM$^{n+}_{1/n}$, PA610/6AISM$^{n+}_{1/n}$, PA106/10AISM$^{n+}_{1/n}$, PA 61 2/6AISM$^{n+}_{1/n}$, PA1010/10AISM$^{n+}_{1/n}$, PA1012/10AISM$^{n+}_{1/n}$ and PA1212/12AISM$^{n+}_{1/n}$, PA66/6T/6AISM$^{n+}_{1/n}$, in particular M$^{n+}_{1/N}$ is lithium and/or sodium, and more particularly it is PA66/6AISLi and/or PA66/6AISNa.

The term "PAZ/XAISM$^{n+}_{1/n}$" in which X and Z are independent of one another and represent integers ranging from 3 to 36, in particular from 4 to 18, especially from 4 to 12, is intended to mean a copolymer obtained by polymerization, in particular random polymerization,
of an amino acid or a lactam, which is in particular aliphatic, comprising Z−1 carbon atoms separating the acid function and the amine function involved in the amide bonds,
of a diamine, in particular an aliphatic diamine, comprising X carbon atoms separating the two amine functions involved in the amide bonds, and
of 5-sulfoisophthalic acid of lithium, sodium, potassium, silver, copper I or II, zinc, manganese, magnesium, iron II or III, ammonium or phosphonium 5-sulfoisophthalate, in particular lithium and/or sodium.

The amino acid or the lactam can be selected from caprolactam, 6-aminohexanoic acid, 10-aminodecanoic acid, 11-aminoundecanoic acid and 12-dodecanolactam.

Quite particularly, the PAZ/XAISM$^{n+}_{1/n}$ is selected from PA6/6AISM$^{n+}_{1/n}$, PA11/6AISM$^{n+}_{1/n}$ and PA12/6AISM$^{n+}_{1/n}$, and even more particularly it is PA6/6AiSM$^{n+}_{1/n}$, quite particularly M$^{n+}_{1/n}$ is Li$^+$ and/or Na$^+$.

The copolymer A comprises, or even consists of, PA66/6AISLi and/or PA66/6AISNa.

The term "PA66/6AISLi and/or PA66/6AISNa" is intended to mean a copolymer, in particular a random copolymer, comprising a repeat unit of the type hexamethylenediamine-adipic acid and a repeat unit of the type hexamethylenediamine-lithium and/or sodium salt of 5-sulfoisophthalic acid.

The copolymer A of PAXY/XAISM$^{n+}_{1/n}$ type can comprise another monomer, in particular diacid, and quite particularly terephthalic acid, in particular in order to give PAXY/XT/XAISM$^{n+}_{1/n}$.

Quite particularly, the copolymer A, in particular PA66/6AISLi and/or PA66/6AISNa, comprises a content of aromatic repeat unit, in particular 6AISLi and 6AISNa, ranging from 0.1 to 60 mol %, in particular from 0.1 to 20 mol %, especially from 0.5 to 20 mol %, for example from 0.5 to 15 mol %, relative to the total number of repeat units in the polyamide. This content may also be between 1 and 15 mol %, in particular between 2 and 10 mol %, especially between 4 and 10 mol %, relative to the total number of repeat units in the polyamide.

The copolymer A may also comprise monofunctional chain limiters or else may comprise an excess of one of its components. In particular, the copolymer A is imbalanced, in particular the concentration of amine end groups AEG (expressed in meq/kg) is greater than or equal to 1.1×CEG (concentration of acid end groups, expressed in meq/kg) or the CEG is greater than or equal to 1.1×AEG.

The copolymer A can be prepared according to a known process for synthesis of a polyamide. A catalyst and/or stabilizers can be added during the synthesis of the copolymer A.

The copolymer A may have a number-average molecular weight, Mn, of greater than or equal to 8000 g/mol.

In particular, the copolymer A is semi-crystalline, quite particularly it has a degree of crystallinity measured by differential calorimetry as defined in the examples of greater than or equal to 20%.

In particular, the copolymer A has an apparent melt viscosity at 100 s$^{-1}$ and at the melting point of the copolymer A+15° C. ranging from 20 Pa·s to 800 Pa·s.

Quite particularly, the copolymer A is a random copolymer.

According to one variant, the material P used may comprise, in addition to the copolymer A, at least one other thermoplastic polymer, in particular another polyamide or a polyolefin, an impact modifier and/or a plasticizer.

According to another particular embodiment, the material P used comprises at least one other polymer; in this case, the polyamide constitutes a continuous phase. In particular, said polymer is selected from impact modifiers, and/or thermoplastic polymers such as polyethylenes, or PE, polystyrenes, or PS, polypropylenes, or PP, polyesters, polycarbonates, or PC, polyphenylene oxides, or PPO, polyphenylene ethers, or PPE, and mixtures thereof. These polymers can be present in a content ranging from 3% to 60%, in particular from 3% to 50%, especially from 5% to 40%, for example from 5% to 30% by weight relative to the total weight of the material P.

The material P used can comprise at least one impact modifier, that is to say a compound capable of modifying the impact strength of a polyamide composition. These impact modifiers and also the other thermoplastic polymers preferentially comprise functional groups which react with the polyamide.

The term "functional groups which react with the polyamide" is intended to mean groups capable of reacting or of interacting chemically with the amide, acid or amine functions of the polyamide, in particular by covalency, ionic or hydrogen bond interaction or van der Waals bonding. Such reactive groups make it possible to generate mixture morphologies having characteristic range sizes (smallest dimension of a range) of less than 5 µm and to provide good dispersion of the impact modifiers in the polyamide matrix. Good dispersing is generally obtained with impact modifier particles having an average size of between 0.1 and 2 µm in the matrix.

Quite particularly, the impact modifiers and the other thermoplastic polymers comprise functional groups which react with the polyamide as a function of the acid or amine nature of the imbalance ΔEG=CEG−AEG (concentration of acid end groups CEG minus concentration of amine end groups AEG) of the polyamide. Thus, for example, if the AEG is "acid" (CEG>AEG), use will preferentially be made of reactive functional groups capable of reacting or of interacting chemically with the acid functions of the polyamide, in particular by covalency, ionic or hydrogen bond interaction or van der Waals bonding. If, for example, the AEG is "amine" (AEG>CEG), use will preferably be made of reactive functional groups capable of reacting or of interacting chemically with the amine functions of the polyamide, in particular by covalency, ionic or hydrogen bond interaction or van der Waals bonding. Impact modifiers having functional groups which react with the amine end groups of the polyamide are quite particularly used.

The other thermoplastic polymers and the impact modifiers may comprise in themselves functional groups which react with the polyamide, for example as regards ethylene/acrylic acid (EAA).

It is also possible to add thereto functional groups which react with the polyamide, generally by grafting or copolymerization, for example for ethylene/propylene/diene (EPDM) grafted with maleic anhydride.

Use may be made of the other thermoplastic polymers and the impact modifiers which are oligomeric or polymeric compounds comprising at least one of the following monomers or a mixture thereof: ethylene, propylene, butene, isoprene, diene, acrylate, butadiene, styrene, octene, acrylonitrile, acrylic acid, methacrylic acid, vinyl acetate, vinyl esters, such as acrylic and methacrylic esters and glycidyl methacrylate. According to one variant, these compounds also comprise monomers other than those mentioned above. According to another variant, they comprise only the monomers mentioned above. According to yet another variant, these compounds are ionomers.

The base of the impact modifier or of the other thermoplastic polymers, optionally known as elastomer base, can be selected from the group consisting of: polypropylenes, polybutenes, polyisoprenes, ethylene/propylene copolymers (EPR), ethylene/propylene/diene (EPDM) copolymers, ethylene and butene copolymers, ethylene and acrylate copolymers, butadiene and styrene copolymers, butadiene and acrylate copolymers, ethylene and octene copolymers, butadiene acrylonitrile copolymers, copolymers of ethylene and of acrylic or methacrylic acid, in particular ethylene/acrylic acid (EAA) products, ethylene/vinyl acetate (EVA) products, ethylene/acrylic ester (EAE) products, acrylonitrile/butadiene/styrene (ABS) copolymers, styrene/ethylene/butadiene/styrene (SEBS) block copolymers, styrene/butadiene/styrene (SBS) copolymers, core/shell elastomers of methacrylate/butadiene/styrene (MBS) type, or mixtures of at least two elastomers listed above.

In addition to the groups listed above, these other thermoplastic polymers and these impact modifiers can comprise, generally grafted or copolymerized, functional groups which react with the polyamide, such as, in particular, the following functional groups: acids, such as carboxylic acids, salified acids, esters in particular, acrylates and methacrylates, ionomers, glycidyl groups, in particular epoxy groups, glycidyl esters, anhydrides, in particular maleic or phthalic anhydrides, oxazolines, maleimides or mixtures thereof.

Such functional groups on the elastomers are, for example, obtained by use of a comonomer during the preparation of the elastomer or by free-radical grafting, in particular by reactive extrusion.

Mention may in particular be made, as other thermoplastic polymers and impact modifiers comprising functional groups which react with the polyamide, of terpolymers of ethylene, acrylic ester and glycidyl methacrylate, copolymers of ethylene and of butyl ester acrylate, copolymers of ethylene, n-butyl acrylate and glycidyl methacrylate, copolymers of ethylene and of maleic anhydride, ethylene/propylene/diene copolymers or ethylene/propylene copolymers grafted with maleic anhydride, styrene/maleimide copolymers grafted with maleic anhydride, styrene/ethylene/butylene/styrene copolymers modified with maleic anhydride, styrene/acrylonitrile copolymers grafted with maleic anhydrides, acrylonitrile/butadiene/styrene copolymers grafted with maleic anhydrides, and hydrogenated versions thereof.

The proportion by weight of the impact modifiers in the material P used can range from 3% to 60%, in particular from 3% to 40%, especially from 5% to 40%, for example from 5% to 30% by weight relative to the total weight of the material P.

In particular, the total content of impact modifiers and of other polymer can range from 3% to 60%, in particular from 3% to 40%, especially from 5% to 40%, for example from 5% to 30% by weight relative to the total weight of the material P.

According to another variant, the material P used comprises a content of copolymer A, in particular of PA66/6AISM, of at least 90% by weight, especially of at least 95% by weight, in particular of at least 98% by weight relative to the total weight of the material P, even more particularly, the material P used consists of copolymer A, in particular of PA66/6AISM. In this variant, the material P used may be free of polymers other than the copolymer A.

The material P used may comprise other additives, such as pigments, mineral or organic fillers, matting agents, heat-, light- and/or UV-stabilizers, lubricants, plasticizers or flame retardants.

The pigments can be selected from carbon black, quinacridones and pyrroles.

The fillers can be selected from:
mineral fillers, in particular selected from montmorillonite, talc, in particular micronized talc, zirconium phosphate, mica, sepiolite, zinc oxide, calcium carbonate, silica, metal particles such as silver, graphite, carbon nanotubes, phosphinic acid salts such as sodium, calcium and/or zinc phosphinates, calcium fluoride, molybdenum disulfide, silica, alumina, titanium dioxide, and mixtures thereof, organic fillers, in particular selected from PA22, aramids, in particular in the form of fibers, cyclodextrins, and mixtures thereof, and mixtures of organic and mineral filler(s).

Quite particularly, the material P used comprises no reinforcing fillers, and in particular no glass fibers.

The fillers can be present in a content ranging from 0.1% to 10%, in particular from 0.1% to 5% by weight relative to the total weight of the copolymer A.

The heat- and/or light-stabilizers can be selected from CuI/KI, CuO/KBr, $Cu_2O$/KBr, hindered phenolic compounds, stabilizers which have at least one hindered amine unit of HALS type, and organic or inorganic phosphorus-containing stabilizers, such as sodium or magnesium hypophosphite. These stabilizers can be present in a content ranging from 0.2% to 2% by weight relative to the total weight of the material P.

The material P used may comprise a lubricant, or a mixture of lubricants. In particular, the lubricant can be present in a content ranging from 0.1% to 5% by weight relative to the total weight of the material P.

The lubricant can be selected from fatty acids, fatty acid metal salts, fatty acid esters, fatty acid amides, such as N,N'-ethylenebis(stearamide), and mixtures thereof. These compounds can be saturated or unsaturated. Mention may be made, as fatty acids which may be suitable in the context of the invention, of fatty acids comprising at least 16 carbon atoms. Mention may be made, as examples of such fatty acids, of lauric acid, myristic acid, palmitic acid, stearic acid, alginic acid, behenic acid, lignoceric acid, serotinic acid, melissic acid or eicosanoic acid. Stearic acid is preferred. The fatty acids are advantageously mono- or divalent carboxylic acids having from 6 to 24 carbon atoms. Mention may be made, among these divalent acids, of pelargonic acid, margaric acid or dodecanedicarboxylic acid.

Fatty acid salts as described above are preferentially selected as fatty acid metal salt. Mention may be made, as examples of fatty acid metal salts, of aluminum, calcium, magnesium or zinc stearate. Mention may also be made of aluminum distearate, aluminum tristearate, and the like. Preferably, the fatty acid metal salt is aluminum distearate.

The fatty acids and the fatty acid metal salts may exhibit a chain-limiting effect on the polyamide.

As fatty acid esters, mention may be made of the esters obtained by reaction between at least one fatty acid defined above and at least one aliphatic fatty alcohol which generally comprises at least 12 carbon atoms. Mention may be made, as examples of fatty alcohols, of lauryl alcohol, myristyl alcohol, palmityl alcohol, stearyl alcohol, eicosyl alcohol, biphenyl alcohol, tetracosyl alcohol, serotinyl alcohol or melissyl alcohol. They can also be ethoxylated fatty alcohols.

The lubricant can be a paraffin. The paraffins are in the form of pure substances or of industrial mixtures. They can be oils of hydrocarbons or waxes. They are generally saturated or unsaturated aliphatic hydrocarbon-based compounds. Advantageously, the lubricant is a paraffin, the average number of carbon atoms of which is between 8 and 100, preferably between 12 and 80 and advantageously between 15 and 50.

The material P used can comprise a flame retardant. A flame retardant is a compound which makes it possible to reduce the propagation of the flame and/or which has flame-retarding properties. Among the flame retardants normally used in flame-retardant compositions, mention may be made of those described in U.S. Pat. Nos. 6,344,158, 6,365,071, 6,211,402 and 6,255,371.

The flame retardant may be a flame retardant comprising phosphorus, a flame retardant of nitrogenous organic compound type, or a flame retardant containing halogenated derivatives.

In particular, the flame retardant may be a combination of phosphorus-comprising compounds, such as phosphine oxides, phosphonic acids or salts thereof or phosphinic acids or salts thereof, and cyclic phosphonates, with nitrogen-comprising derivatives, such as melam, melem, melamine phosphate, melamine polyphosphates, melamine pyrophosphates or ammonium polyphosphates.

The material P used may comprise a content of flame retardant ranging from 5% to 40% by weight, in particular from 10% to 30% by weight relative to the total weight of the material P.

The material P used may also comprise at least one plasticizer. The plasticizer(s) can be selected from benzenesulfonamide derivatives, such as n-butylbenzenesulfonamide (BBSA), ethyl toluenesulfonamide or N-cyclohexyl toluenesulfonamide; polyethylene glycols or propylene glycols; hydroxybenzoic acid esters, such as 2-ethylhexyl para-hydroxybenzoate and 2-decylhexyl para-hydroxybenzoate; tetrahydrofurfuryl alcohol esters or ethers and esters of citric acid or of hydroxymalonic acid. The material P may comprise a content of plasticizer ranging from 1% to 30% by weight, in particular from 5% to 20% by weight relative to the total weight of the material P.

The material P used is in the form of a film, a textile or a layer. This material can be in the form of a roll, in particular having a width of at least 50 cm, or even of at least 1 m.

The film of material P can have a thickness ranging from 10 to 500 µm, in particular from 20 to 400 µm, especially from 30 to 300 µm.

When the material P used is in the form of a layer, said layer can have a thickness ranging from 1 to 500 µm, in particular from 10 to 200 µm. Advantageously, said layer is supported by a reinforcement.

The layer or the film can in particular be deposited by spraying or by application of a dispersion of material P, in particular like a paint.

The textile can have a thickness ranging from 50 µm to 2 mm, in particular from 300 to 800 µm. It is in particular woven, of course in such a way that it has the vapor-permeability characteristics presented in the description.

In particular, the film, the layer and/or the textile of material P used is watertight.

In particular, the film, the layer or the textile of material P used as a vapor barrier exhibits good airtightness.

The support may be solid or liquid. When it is solid, it's generally has a reinforcing function, in particular against tearing. When it is liquid, it generally makes it possible to deposit a layer of material P on a solid support. In this case, the layer can be obtained by means of an application like paint.

The solid support can be present on the entire surface of the barrier or, on the contrary, on certain zones, in particular on the sides, for example in order to improve the tearing strength, in particular to allow the barrier to be efficiently attached, for example with staples.

The solid support can be a cellulose-based material, in particular reinforced with fibers, such as a paper, a membrane, in particular made of fabric of synthetic fibers or a perforated polyethylene film, for example a fabric consisting of woven or nonwoven fibers, in particular of polyolefin or polyester, a construction material such as blocks of construction materials, in particular made of plaster, cement, etc., or else on sheets of insulating materials, such as glass wool.

The construction materials are used to produce wall or roof structures. As construction materials, mention may particularly be made of structural materials consisting of wood, of reinforced or non-reinforced concrete, of bricks or of metal, fibrous insulating materials such as mineral wools, natural fibers, non-fibrous insulating materials such as mineral foams, cellular glass, synthetic organic insulating materials such as polystyrene, facing materials such as plaster boards optionally covered with cardboard, wood or plastic paneling, particle panels or ceramic tiles, leaktight materials for roof lining such as plastic films, fabrics made of synthetic fibers or bituminous felts, materials for roof covering or for external siding, such as tiles, slates, metal sheets, glass, plastic or organic materials, wood, bituminous or asphalt materials, or fiber-cement.

In one particular embodiment, said material P is used, as a vapor barrier, in combination with a solid support which can be in particular a construction material and/or a membrane of the abovementioned type, in particular a nonwoven membrane, which can typically act as a reinforcing membrane (solid reinforcement of the material P).

Preferably, the solid support comprises, or even consists of, a construction material as described above.

In one embodiment, the solid support comprises, or even consists of, a construction material and a membrane.

In one particular embodiment, the solid support used in combination with the material P is selecting from wood and fibrous insulating materials. Where appropriate, this solid support can be used in combination with a solid reinforcement of the abovementioned type.

Generally, the layer, the film or the textile of material P used is present on the exterior of the solid reinforcement, but, according to another variant, this layer, this film or this textile of material P used can be surrounded by two identical or different solid supports.

The material P can in particular be combined, for example by co-lamination, with a nonwoven membrane as solid reinforcement. The material P, whether or not it is combined with such a membrane, can be used with a construction material. Typically, the material P optionally combined with such a membrane can be surrounded by two identical or different construction materials, for example wood.

When the support is liquid, it can make it possible to obtain a solution/dispersion suitable for applying a film or a layer of material P to a solid support, in particular as described in the previous paragraph, or else to a wall.

An adhesive may also be placed on the textile, the film or the layer of material P used, or even, as appropriate, on the solid support of the textile, of the film or of the layer of material P. This can enable easier application of the barrier.

Advantageously, the solid support does not limit the vapor permeability of the film, the textile or the layer of material P used. Preferably, to this effect, a solid support of which the vapor permeability is greater than that of the material P is used.

The vapor barrier can also comprise an adhesive placed directly on the copolyamide A or on the solid support of said barrier. This adhesive layer can in particular make it possible to attach said barrier more easily.

In particular, the limitation of the vapor permeability of the vapor barrier is due only to the film, to the textile or to the layer of material P used.

The barrier advantageously has a vapor permeability at 23° C. and at an average humidity level of 25% of less than or equal to 0.22 g·mm/m$^2$·J, in particular less than or equal to 0.20 g·mm/m$^2$·J, quite particularly less than or equal to 0.18 g·mm/m$^2$·J, or even less than or equal to 0.15 g·mm/m$^2$·J.

In particular, the barrier has a water vapor permeability at 23° C. and at an average humidity level of 25% which is decreased by at least 25%, in particular by at least 30%, relative to virgin PA6.

In particular, in the case of a use in relation to frameworks of buildings, since the barrier according to the invention has a very low vapor permeability at low humidity level, it can therefore in particular make it possible to insulate the framework from the humidity present in the house, and therefore make it possible to prevent said humidity from condensing on the framework. This can in particular correspond to winter conditions.

Said barrier can also have a vapor permeability at 23° C. and at an average humidity level of 75% of greater than or equal to 3.5 g·mm/m$^2$·J, in particular greater than or equal to 4 g·mm/m$^2$·J, quite particularly greater than or equal to 4.5 g·mm/m$^2$·J, or even greater than or equal to 5 g·mm/m$^2$·J.

This can in particular allow, when the surrounding humidity is high, good exchange and therefore efficient drying of the structures comprising a material capable of absorbing water, such as wood.

In particular, the barrier has a water vapor permeability at 23° C. and at an average humidity level of 75% which is increased by at least 30%, in particular by at least 40%, relative to virgin PA6.

Quite particularly, said material has a vapor permeability at an average humidity level of 75% which is at least 20 times higher than the vapor permeability at an average humidity level of 25%.

The combination of these properties can therefore enable good breathing in humid conditions and good insulation in dry conditions.

A subject of the present invention is also a construction element comprising at least one construction material of the abovementioned type and at least one film, one textile or one layer of material P, characterized in that said film, textile or layer of material P is as defined above according to the first subject of the invention.

In one embodiment, this construction element can comprise a solid support selected from cellulose-based materials, membranes, and sheets of insulating materials.

Everything which has been described above in the context of the use according to the first subject of the invention applies to this construction element and in particular to the construction material, to the optional solid support and to the material P.

The invention also relates to an article comprising a barrier as defined above, it being possible for said article to be an item of clothing, in particular of skiwear and/or rainwear, an undergarment, a part of the shoe, in particular a shoe sole, a construction material, such as a vapor barrier membrane, a tarp, an article of bedding, such as a blanket, a sheet or a pillow, a material for covering furniture, such as a seat cover, etc.

The following examples are intended to illustrate the invention without, however, limiting the scope thereof.

EXPERIMENTAL SECTION

Characterizations
Physicochemical Property Analysis

The acid end group (CEG) and amine end group (AEG) contents are assayed by potentiometry, expressed in meq/kg.

The number-average molar mass Mn is determined by the formula Mn=2.10$^6$/(AEG+CEG), and expressed in g/mol.

Thermal Property Analysis:

The melting points (Mp), crystallization temperatures on cooling (Tc) and glass transition temperatures (Tg) of the extruded films obtained are determined by Differential Scanning calorimetry (DSC), using a TA Instruments Q2000 device, at a rate of 10° C./min. The degree of crystallinity is obtained by calculating Xc=ΔHf/ΔHf°, where ΔHf is the enthalpy of fusion of the polyamide sample tested and ΔHf° is the enthalpy of fusion of a pure polyamide crystal (ΔHf° (PA66)=188 J/g). The values are given for dry products.

Water Vapor Permeability Analysis:

The extruded films are conditioned at 23° C. at relative humidity of 50% (RH50) until their water uptake reaches equilibrium. The water vapor permeability is then evaluated at various relative humidities.

Average Relative Humidity of 75% (RH$_{75}$):

Polymer films, the thickness of which has been accurately measured (approximately 300 μm), are attached in leaktight-sealed aluminum permeation crucibles containing liquid water, with the internal face of the polymer film in contact with water vapor, and a layer of air of approximately 1 cm being present between the liquid water and the polymer. The cells are then placed in a laboratory in which the environment is regulated in terms of temperature (23° C.) and in terms of relative humidity (50%).

In this configuration, the polymer film is exposed on the cell side to a relative humidity of 100% and on the external environment side to a relative humidity of 50%, it being possible for the average relative humidity in the membrane to be considered as equal to ((50+100)/2)=75%.

The weight of the assembly (crucible+film+water) is measured over time. After a certain time called the induction time, a weight loss corresponding to the water vapor permeation through the polymer film from the inside of the crucible to the outside is measured, and a permeability value representing this weight loss related to time, at the film surface and multiplied by the film thickness can be established (Permeability P expressed in g·mm/m$^2$·J).

Average Relative Humidity of 25% (RH$_{25}$):

Polymer films, the thickness of which has been accurately measured (approximately 300 μm), are attached in leaktight-sealed aluminum permeation crucibles containing silica gel dried for 48 h at 110° C. The internal face of the polymer film is in contact with dry air, a layer of air of approximately 1 cm being present between the silica gel and the polymer.

The cells are placed in a laboratory in which the environment is regulated in terms of temperature (23° C.) and in terms of relative humidity (50%). In this configuration, the polymer film is exposed on the cell side to a relative humidity of 0% and on the external environment side to a relative humidity of 50%, it being possible for the average relative humidity in the membrane to be considered as equal to ((0+50)/2)=25%.

The weight of the assembly (crucible+film+water) is measured over time. After a certain time called the induction time, a weight gain corresponding to the water vapor permeation through the polymer film from the outside of the crucible to the inside is measured, and a permeability value representing this weight gain related to time, at the film surface and multiplied by the film thickness can be established (Permeability P to water vapor, expressed in g·mm/m$^2$·J).

Example 1 (Comparative): Films of Non-Modified PA66

92.6 kg (353 mol) of salt N (1:1 hexamethylene diamine and adipic acid salt), 84 kg of demineralized water and 6.4 g of antifoam Silcolapse 5020® are placed in a polymerization reactor. The polyamide 66 is made according to a standard polyamide 66 polymerization process, with 30 minutes finishing. The polymer obtained is poured into rods, cooled, and shaped into granules by cutting the rods.

The polymer obtained has the following characteristics: CEG=70.2 meq/kg, AEG=51.5 meq/kg, Mn=16 430 g/mol.

The granules of PA66 are then placed in a twin-screw co-rotating Leistritz extruder (D=34, L/D=35), with screw rate 255 rpm and temperature 280° C. An OCS wrapping machine with a flat sheet die (width 300, gap 500 μm) delivers films 300 μm thick, the film coming out of the die being stretched at a rate of 2 m/minute, the cooling roll temperature being 135° C.

The films obtained have the following thermal characteristics: PA 66: Tg=62° C., Mp=262° C., Tc=229° C., ΔHf=68 J/g i.e. Xc=36.1%.

The water vapor-barrier properties at 23° C. are then determined.

At RH$_{25}$, the permeability P$_{RH25}$ is 0.23±0.01 g·mm/m$^2$·J
At RH$_{75}$, the permeability P$_{RH75}$ is 2.7±0.5 g·mm/m$^2$·J Example 2: Polyamide 66 Sulfonate PA66/6AISLi 95/5 Mol/Mol 85.9 kg (327.5 mol) of salt N (1:1 salt of hexamethylene diamine and adipic acid), 4,657 g of lithium 5-sulfoisophthalic acid salt at 93.33% (AISLi) (17.24 mol), 6,435 g of a solution of hexamethylene diamine (HMD) in solution in water at 32.47% by weight (17.98 mol) and 81.2 kg of demineralized water and 6.4 g of Silcolapse 5020® antifoam are placed in a polymerization reactor. The polyamide 66 sulfonate is made according to a standard polyamide 66 polymerization process, with 30 minutes finishing at atmospheric pressure. The polymer obtained is poured into rods, cooled, and shaped into granules by cutting the rods.

The polymer obtained has the following characteristics: CEG=102.6 meq/kg, AEG=94.3 meq/kg, Mn 32 10 160 g/mol.

The granules of PA66 sulfonate PA 66/6AISLi 95/5 mol/mol are then placed in a twin-screw co-rotating Leistritz extruder (D=34, L/D=35), with screw rate 255 rpm and temperature 280° C. An OCS wrapping machine with a flat sheet die (width 300, gap 500 μm) delivers films 300 μm thick, the film coming out of the die being stretched at a rate of 2 m/minute, the cooling roll temperature being 135° C.

The film obtained has the following thermal characteristics: PA66/6AISLi (95/5): Tg=88° C., Mp=253° C., Tc=220° C., ΔHf=66 J/g i.e. Xc=35%.

The water vapor-barrier properties at 23° C. are then determined.

At RH$_{25}$, the permeability P$_{RH25}$ is 0.14±0.01 g·mm/m$^2$·J, i.e. a 40% reduction in permeability in comparison with the non-modified PA66 film.

At RH$_{75}$, the permeability P$_{RH75}$ is 5.3±0.3 g·mm/m$^2$·J, i.e. a 100% increase in permeability in comparison with the non-modified PA66 film.

The PA66/6AISLi 95/5 mol/mol film thus exhibits a decrease in permeability in "winter"-type conditions (at low RH, −40% is achieved) and an increase in permeability in "summer"-type conditions (at high RH, +100% is achieved) compared with a non-modified PA66 film. A factor of 38 is obtained between the permeability at low RH and the permeability at high RH.

Example 3: Polyamide 66 Sulfonate PA66/6AISNa 95/5 Mol/Mol

The polyamides of example 3 is produced according to the same protocol as the one presented in example 2, except that the sodium salt of 5-sulfoisophthalic acid at 95% (AISNa) is used.

The polymer obtained has the following characteristics: CEG=112.7 meq/kg, AEG=99.0 meq/kg, Mn=9450 g/mol.

The granules and then the film of this polyamide are obtained in the same way as described in example 2.

The film obtained has the following thermal characteristics: PA66/6AISNa (95/5): Tg=87° C., Mp=253° C., Tc=221° C., ΔHf=64 J/g i.e. Xc=34%.

The water vapor-barrier properties at 23° C. are then determined.

At $RH_{25}$, the permeability $P_{RH25}$ is 0.21±0.02 g·mm/m²·J, i.e. a 10% reduction in permeability in comparison with the non-modified PA66 film.

At $RH_{75}$, the permeability $P_{RH75}$ is 11.79±0.2 g·mm/m²·J, i.e. a more than 300% increase in permeability in comparison with the non-modified PA66 film.

The PA66/6AISNa 95/5 mol/mol film thus exhibits a decrease in permeability in "winter"-type conditions (at low RH, −10% is achieved) and a very strong increase in permeability in "summer"-type conditions (at high RH, +300% is achieved) compared with a non-modified PA66 film. A factor of 56 is obtained between the permeability at low RH and the permeability at high RH.

The invention claimed is:

1. A method for manufacturing an ambient humidity adaptive water vapor barrier, the method comprising
preparing a film, a textile or a layer of material P, said material P comprising at least one copolymer A which is a polyamide represented by PAXY/XAIS $M^{n+}_{1/n}$ or represented by PAZ/XAISM$^{n+}_{1/n}$,
in which
X, Y and Z represent, independently of one another, integers ranging from 3 to 36,
$M^{n+}_{1/n}$, with n representing the number of charges of M, and M representing Li$^+$, Na$^+$, K$^+$, Ag$^+$, Cu$^+$, Cu$^{2+}$Zn$^{2+}$, Mn$^{2+}$, Mg$^{2+}$, Fe$^{2+}$, Fe$^{3+}$, Al$^{3+}$, NH$^{4+}$, and/or phosphonium, and
AIS represents a residue derived from 5-sulfoisophthalic acid; and
combining the film, textile or layer of material P with a solid support selected from the group consisting of reinforced or non-reinforced concrete, bricks, metal, cellular glass, metal sheets, and glass; wherein the film, textile or layer of material P, has a water vapor permeability:
less than or equal to 0.25 g·mm/m²·J, at 23° C. and at an average humidity level of 25%, and/or
greater than or equal to 3 g·mm/m²·J, at 23° C. and at an average humidity level of 75%.

2. The method according to claim 1, wherein the film, textile or layer of material P, has a (water vapor permeability at 23° C. and at an average humidity level of 75%)/(water vapor permeability at 23° C. and at an average humidity level of 25%) ratio greater than or equal to 15.

3. The method according to claim 2, wherein the film, textile or layer of material P, has a (water vapor permeability at 23° C. and at an average humidity level of 75%)/(water vapor permeability at 23° C. and at an average humidity level of 25%) ratio greater than or equal to 35.

4. The method according to claim 1, wherein the copolymer A is obtained by polymerization:
of a diamine selected from the group consisting of 1,4-diaminobutane, 1,5-diaminopentane, 1,6-diaminohexane or hexamethylenediamine (HMD), 2-methylpentamethylenediamine, 2-methylhexamethylenediamine, 3-methylhexamethylenediamine, 2,5-dimethylhexamethylenediamine, 2,2-dimethylpentamethylenediamine, 1,8-diaminooctane, methyl-1,8-diaminooctane, 1,9-diaminononane, 5-methylnonanediamine, 1,10-diaminodecane or decamethylenediamine, 1,12-diaminododecane, or dodecamethylenediamine, and N-(6-aminohexyl)-N-methyl-1,6-hexanediamine,
of a diacid selected from the group consisting of oxalic acid, succinic acid (HOOC—(CH$_2$)$_2$—COOH), glutaric acid (HOOC—(CH$_2$)$_3$—COOH), 2-methylglutaric acid (HOOC—CH(CH$_3$)—(CH$_2$)$_2$—COOH), 2,2-dimethylglutaric acid (HOOC—C(CH$_3$)$_2$—(CH$_2$)$_2$—COOH), adipic acid (HOOC—(CH$_2$)$_4$—COOH), 2,4,4-trimethyladipic acid (HOOC—CH(CH$_3$)—CH$_2$—C(CH$_3$)$_2$—CH$_2$—COOH), pimelic acid (HOOC—(CH$_2$)$_5$—COOH), suberic acid (HOOC—(CH$_2$)$_6$—COOH), azelaic acid (HOOC—(CH$_2$)$_7$—COOH), sebacic acid (HOOC—(CH$_2$)$_8$—COOH), undecanedioic acid (HOOC—(CH$_2$)$_9$—COOH), dodecanedioic acid (HOOC—(CH$_2$)$_{10}$—COOH), terephthalic acid and isophthalic acid, and
of 5-sulfoisophthalic acid of lithium, sodium, potassium, silver, copper I or II, zinc, manganese, magnesium, iron II or III, ammonium or phosphonium.

5. The method according to claim 1, wherein the copolymer A is obtained by polymerization:
of a diamine selected from the group consisting of 1,4-diaminobutane, 1,5-diaminopentane, 1,6-diaminohexane or hexamethylenediamine (HMD), 2-methylpentamethylenediamine, 2-methylhexamethylenediamine, 3-methylhexamethylenediamine, 2,5-dimethylhexamethylenediamine, 2,2-dimethylpentamethylenediamine, 1,8-diaminooctane, methyl-1,8-diaminooctane, 1,9-diaminononane, 5-methylnonanediamine, 1,10-diaminodecane or decamethylenediamine, 1,12-diaminododecane, or dodecamethylenediamine, and N-(6-aminohexyl)-N-methyl-1,6-hexanediamine,
of an amino acid or a lactam selected from the group consisting of caprolactam, 6-aminohexanoic acid, 10-aminodecanoic acid, 11-aminoundecanoic acid and 12-dodecanolactam, and
of 5-sulfoisophthalic acid of lithium, sodium, potassium, silver, copper I or II, zinc, manganese, magnesium, iron II or III, ammonium or phosphonium.

6. The method according to claim 1, wherein the copolymer A comprises PA66/6AISLi and/or PA66/6AISNa.

7. The method according to claim 1, wherein the copolymer A comprises a content of aromatic repeat unit ranging from 0.1 to 60 mol %, relative to the total number of repeat units in the polyamide.

8. The method according to claim 1, wherein the material P further comprises at least one other polymer, in this case the polyamide constitutes a continuous phase.

9. The method according to claim 1, wherein the material P comprises at least one impact modifier, i.e. a compound capable of modifying the impact strength of a polyamide composition.

10. The method according to claim 1, wherein the material P further comprises pigments, mineral or organic fillers, matting agents, heat-, light- and/or UV-stabilizers, lubricants, plasticizers or flame retardants.

11. The method according to claim 1, wherein the film of material P has a thickness ranging from 10 to 500 µm, the layer of material P has a thickness ranging from 1 to 500 µm or the textile of material P has a thickness ranging from 50 µm to 2 mm.

12. The method according to claim 1, wherein X, Y and Z represent, independently of one another, integers ranging from 4 to 18.

13. The method according to claim 1, wherein X, Y and Z represent, independently of one another, integers ranging from 4 to 12.

14. The method according to claim 1, wherein M represents $Li^+$ and/or $Na^+$.

15. A construction element comprising at least one film, one textile or one layer of material P and at least one construction material suitable for producing wall or roof structures selected from the group consisting of reinforced or non-reinforced concrete, bricks, metal, cellular glass, metal sheets, and glass;

wherein said material P comprises at least one copolymer A which is a polyamide represented by $PAXY/XAIS\ M^{n+}{}_{1/n}$ or represented by $PAZ/XAISM^{n+}{}_{1/n}$, in which X, Y and Z represent, independently of one another, integers ranging from 3 to 36, $M^{n+}{}_{1/n}$, with n representing the number of charges of M, and M representing $Li^+$, $Na^+$, $K^+$, $Ag^+$, $Cu^+$, $Cu^{2+}$ $Zn^{2+}$, $Mn^{2+}$, $Mg^{2-}$, $Fe^{2+}$, $Fe^{3+}$, $Al^{3+}$, $NH^{4+}$, and/or phosphonium, and AIS represents a residue derived from 5-sulfoisophthalic acid.

* * * * *